UNITED STATES PATENT OFFICE.

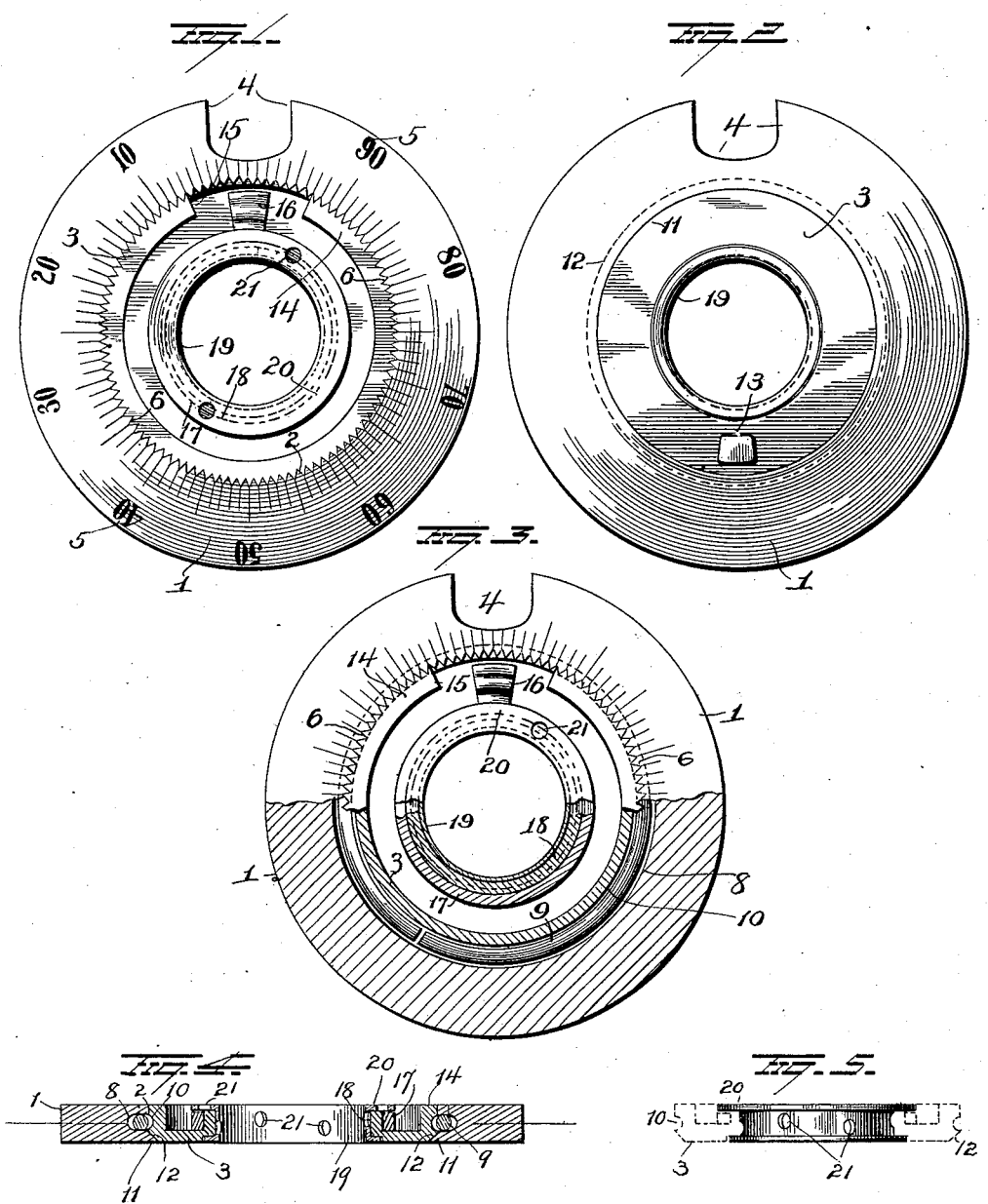

WARREN H. TAYLOR, OF STAMFORD, CONNECTICUT, ASSIGNOR TO THE YALE & TOWNE MANUFACTURING COMPANY, OF STAMFORD, CONNECTICUT.

TUMBLER FOR COMBINATION-LOCKS.

1,032,963.  Specification of Letters Patent.  Patented July 16, 1912.

Application filed May 1, 1912. Serial No. 694,538.

*To all whom it may concern:*

Be it known that I, WARREN H. TAYLOR, a citizen of the United States, residing at Stamford, in the county of Fairfield and State of Connecticut, have invented certain new and useful Improvements in Tumblers for Combination-Locks; and I do hereby declare the following to be a full, clear, and exact description of the invention, such as will enable others skilled in the art to which it appertains to make and use the same.

My invention relates to an improvement in tumblers for combination locks and particularly to the tumblers disclosed in Patent No. 805,103 granted to me as assignor to the Yale & Towne Manufacturing Company, November 21st, 1905.

The object of the present invention is to provide improved means for securing the fly in place, whereby a free movement of the latter, throughout its entire range of movement is assured, thereby preventing any movement of the tumbler until its fly is seated against its proper abutment, and my invention consists in the details of construction as will be more fully explained and pointed out in the claims.

In the accompanying drawings, Figure 1 is a view in front elevation of a tumbler embodying my invention. Fig. 2 is a similar view of its rear face. Fig. 3 is a view in front elevation partly in section. Fig. 4 is a view in transverse section; and Fig. 5 is a view of the thimble detached.

The class of tumblers to which this invention relates is known as the "hand-changing," that is, tumblers, which when it is desired to change their combinations, can be removed from the lock and the relative position of the two parts composing same changed. Each tumbler consists of two metal rings, one within the other, the outer ring 1 having a central opening 2 of a size sufficiently to snugly receive the inner ring 3. The outer ring 1 is provided with the usual gating 4 and has stamped or engraved upon its front face the graduations 5 usually employed on tumblers of this type.

A series of notches and teeth 6 are formed on the interior edge of the circular opening in the ring 1, and a corresponding series of notches and teeth are formed on the periphery of the inner ring 3, so that when the two rings are assembled all independent rotary movement of one on or in the other is absolutely prevented. To hold the two rings against accidental separation, the outer one is provided with an annular groove 8, to receive the split ring 9, which latter normally projects beyond the edge of the teeth but which can be expanded by the pressure thereagainst of the inner ring, the latter being also provided with a shallow peripheral groove 10, into which the split ring projects when the two rings are assembled. The larger ring 1 is provided on its rear face with a flange 11 around its central opening, which when the parts are assembled prevents the inner ring from passing completely through the outer ring. The rear face of the outer edge of the inner ring is beveled as at 12, which beveled edge bearing against the split ring 9, expands the same and permits the inner ring to be seated within the outer ring with its teeth meshing with the teeth of the outer ring, and these intermeshing teeth together with the split ring prevent any accidental separation of the parts while the flange 11 at the rear side of the opening prevents any rearward creeping movement of the inner ring, due to wear, and absolutely prevents the latter from being pushed too far in, during assembling or after the parts have been assembled.

The inner ring 3 is grooved on its front face to receive the pin 13 on the next adjacent tumbler, and the outer wall 14 of the groove is cut away as at 15 to form end abutments for the fly 16, which latter is engaged by the pin 13 of the next adjacent tumbler, whereby the tumbler carrying the fly, is moved into its proper position. The fly 16 is integral with the ring 17 which rests within the groove in the front face of the inner ring and closely embraces the inner wall 18 of said groove, and is held in place by the thimble or bushing 19. This thimble rests within the opening in the inner ring, and is provided at its front end with a flange 20 which latter projects over the outer surface of the inner wall of the groove and overlaps the ring 17 and thus locks the latter in place, and the thimble is locked in place by upsetting or spinning its rear end over the rear face of the inner ring. This thimble has a close fit within the inner ring 3, and with the ring 17, but it is constructed to turn therein. With the thimble free to move within the ring and also free to move on the spindle, there is absolutely no chance for the tumbler to stick or tend to turn by any frictional contact of the thimble with the spindle. The flange 20 of the thimble and also the body of the latter are provided with recesses or holes 21 into which a lubricant is packed and which serves to keep the surfaces of the moving parts sufficiently lubricated to prevent sticking.

Heretofore the flies have been secured in place by spinning the solid end of the inner wall of the groove over the ring 17. This was unsatisfactory owing to the difficulty in securing an even bearing of the flange formed by upsetting or spinning against the adjacent surface of the ring 17, but by this improvement the overlapping flange of the thimble is perfectly flat so that a free movement of the ring is assured.

Having fully described my invention what I claim as new and desire to secure by Letters-Patent, is:—

1. A tumbler for combination locks composed of an outer ring, an inner ring secured within the outer ring, and provided with a circular groove in its outer face, a ring mounted to turn on the inner wall of said groove and carrying a fly moving in the groove and a thimble secured within the opening in the inner ring and having a flange overlapping the ring carrying the fly.

2. A tumbler for combination locks composed of an outer ring, an inner ring secured within the outer ring and provided with a circular groove in its outer face, a ring carrying a fly and mounted to turn on the inner wall of the circular groove, and a thimble secured within the opening through the inner ring, the said thimble having a flange overlapping the ring carrying the fly, and the rear end of said thimble being upset against the rear face of the inner ring, whereby the thimble is permanently locked to the inner ring.

3. A tumbler for combination locks composed of an outer ring, a ring secured within said outer ring and provided with a circular groove in its outer face, a ring carrying a fly and mounted to turn on the inner wall of said circular groove and a thimble mounted to turn in the central opening of the inner ring and provided with a flange overlapping the ring carrying the fly and provided with holes or recesses for lubricant.

In testimony whereof, I have signed this specification in the presence of two subscribing witnesses.

WARREN H. TAYLOR.

Witnesses:
J. A. GAYLOR,
W. S. ABEL.